(12) United States Patent
Fukunaga

(10) Patent No.: US 11,363,160 B2
(45) Date of Patent: Jun. 14, 2022

(54) DETACHABLE DEVICE, CONTROL METHOD THEREOF, AND STORAGE MEDIUM

(71) Applicant: CANON KABUSHIKI KAISHA, Tokyo (JP)

(72) Inventor: Kentaro Fukunaga, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/211,573

(22) Filed: Mar. 24, 2021

(65) Prior Publication Data
US 2021/0306509 A1    Sep. 30, 2021

(30) Foreign Application Priority Data
Mar. 27, 2020    (JP) .............................. JP2020-058305

(51) Int. Cl.
*H04N 1/21*    (2006.01)
*H04N 5/232*   (2006.01)

(52) U.S. Cl.
CPC ....... *H04N 1/2158* (2013.01); *H04N 5/23206* (2013.01)

(58) Field of Classification Search
CPC .............. H04N 1/3876; H04N 1/2158; H04N 1/00965; H04N 5/23206; H04N 5/23225
See application file for complete search history.

(56) References Cited

U.S. PATENT DOCUMENTS

| 2008/0242303 A1* | 10/2008 | Takahashi | H04W 36/02 455/436 |
| 2010/0309511 A1* | 12/2010 | Ito | H04N 1/00965 358/1.15 |

FOREIGN PATENT DOCUMENTS

JP    2008-244538 A    10/2008

* cited by examiner

*Primary Examiner* — Nelson D. Hernández Hernández
(74) *Attorney, Agent, or Firm* — Cowan, Liebowitz & Latman, P.C.

(57) ABSTRACT

A detachable device that can be attached/detached to/from an electronic apparatus and includes a memory unit: analyzes input data for analysis from the electronic apparatus; divides a processing result obtained by the analysis into a plurality of partial data and store the partial data in a plurality of areas of the memory unit such that addresses are not continuous; determines, based on a parameter included in a read command from the electronic apparatus, whether the read command is a command for reading out the processing result; and if it is determined that the read command is the command for reading out the processing result, reads out the plurality of partial data from the plurality of areas of the memory unit, constructs the partial data to the processing result, and outputs the processing result.

16 Claims, 10 Drawing Sheets

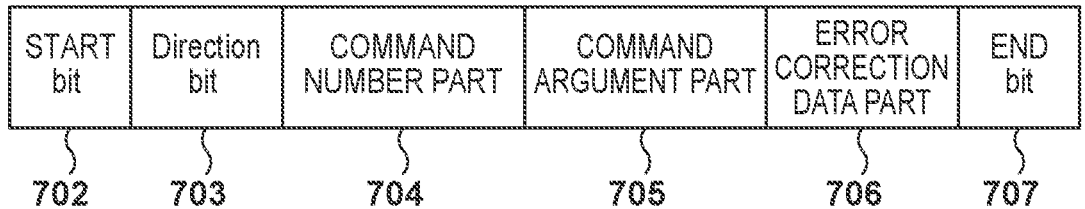
FIG. 7A
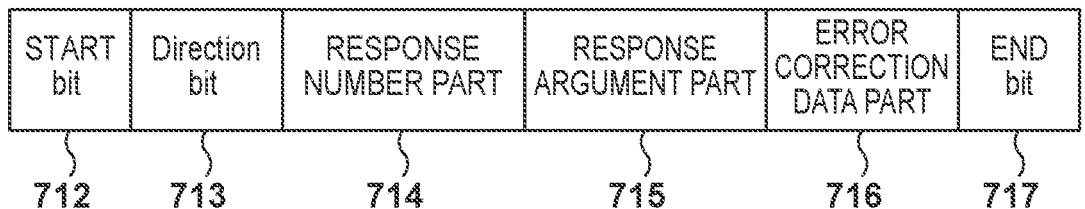
FIG. 7B
FIG. 8
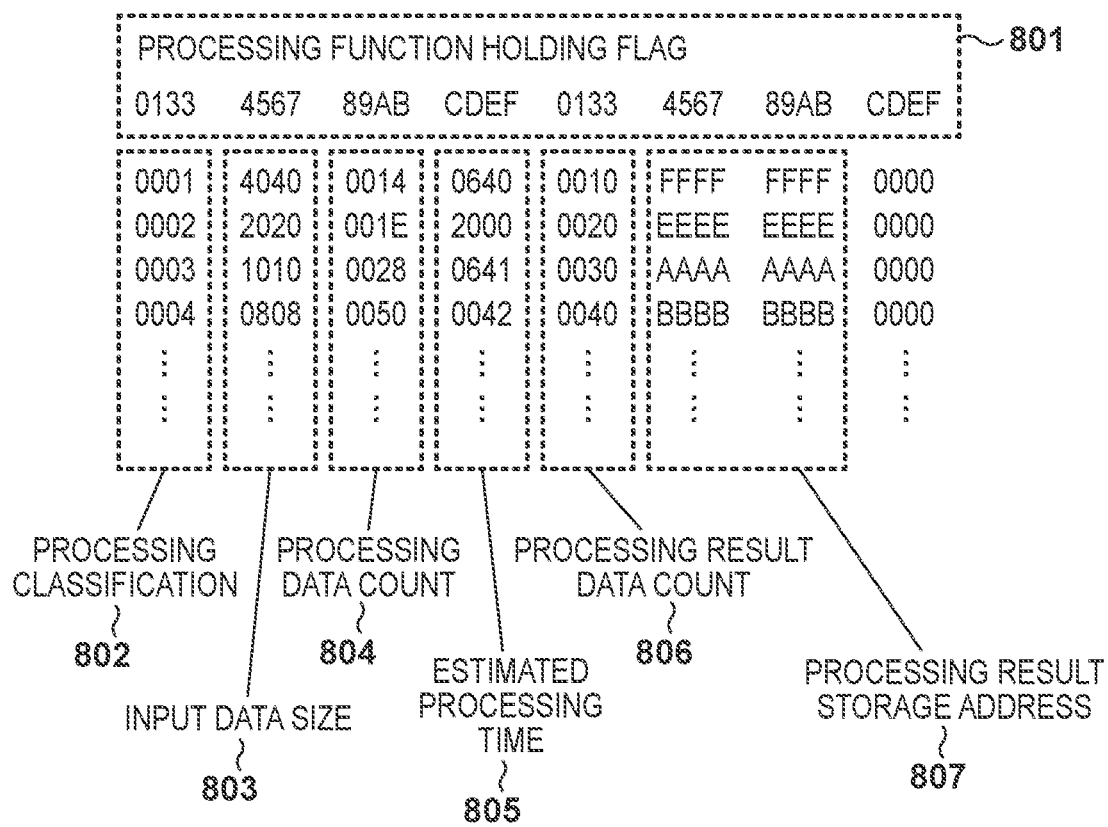

FIG. 9

| PROCESSING CLASSIFICATION | INPUT SIZE | INPUT DATA COUNT | ESTIMATED PROCESSING TIME | PROCESSING RESULT DATA COUNT | ANALYSIS RESULT STORAGE ADDRESS |
|---|---|---|---|---|---|
| ANALYSIS PROCESSING A | 64 x 64 | 20 BLOCK | 100 ns | 16 BLOCK | 0xFFFFFFFF |
| ANALYSIS PROCESSING B | 32 x 32 | 30 BLOCK | 512 ns | 32 BLOCK | 0xEEEEEEEE |
| ANALYSIS PROCESSING C | 16 x 16 | 40 BLOCK | 100 μs | 48 BLOCK | 0xAAAAAAAA |
| ANALYSIS PROCESSING D | 8 x 8 | 80 BLOCK | 4 ms | 64 BLOCK | 0xBBBBBBBB |
| ... | ... | ... | ... | ... | ... |

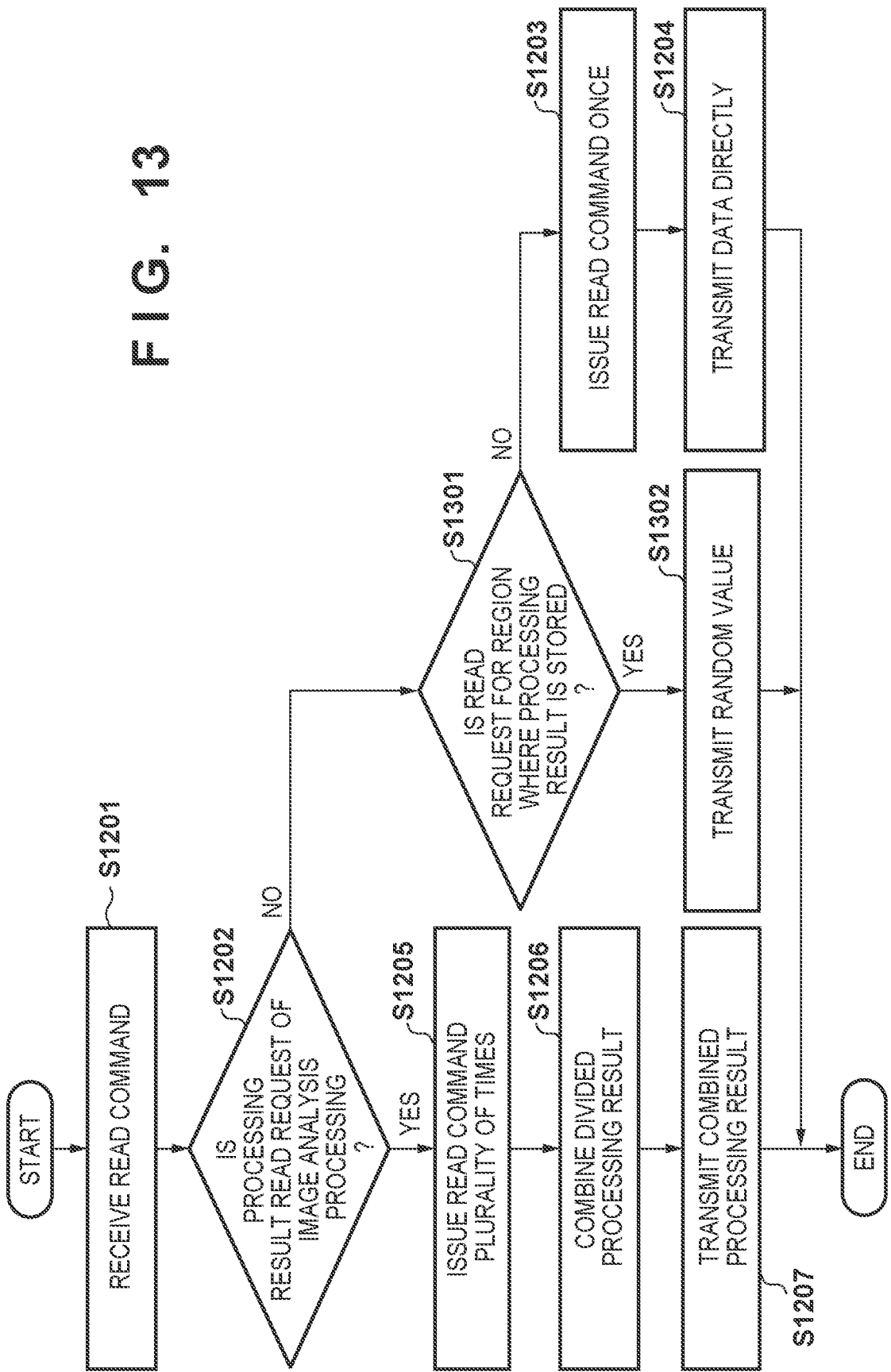

DETACHABLE DEVICE, CONTROL METHOD THEREOF, AND STORAGE MEDIUM

BACKGROUND OF THE INVENTION

Field of the Invention

The present invention relates to a detachable device that can be attached/detached to/from an electronic apparatus, a control method thereof, and a storage medium.

Description of the Related Art

In recent years, image processing such as image analysis of performing object detection and tracking or performing attribute estimation, and estimation of the number of objects based on the result of such image analysis is performed in various scenes using images captured by a monitoring camera. Conventionally, such image processing has been performed by transferring videos from the monitoring camera to a high performance arithmetic apparatus such as a PC or a server that executes actual image processing. However, the recent improvement of the processing capability of mobile arithmetic apparatuses allows the monitoring camera side to perform image processing. Processing on the camera side can be executed by, for example, an arithmetic apparatus arranged in a camera main body. When the arithmetic apparatus is arranged in a detachable device such as a USB, the detachable device can execute at least a part of processing.

For example, if a detachable device having a memory and an image analysis function is attached to an image capture apparatus, it is possible to perform image analysis while recording a video. Since the analysis result includes knowhow in image analysis processing, it is not preferable that a third party reads out the result. However, if an image analysis result is stored in a detachable device, the result may be read out when the detachable device is attached to a different apparatus such as a PC. Japanese Patent Laid-Open No. 2008-244538 (to be referred to as patent literature 1 hereinafter) proposes a technique in which a security area is provided in a detachable device, and management information created at the time of access is collated, thereby enabling access to the security area again.

In patent literature 1, however, high-cost additional processing such as processing of transmitting management information from an image capture apparatus using a dedicated command is needed to protect the processing result of image analysis processing.

SUMMARY OF THE INVENTION

The present invention provides a technique of protecting a processing result of analysis processing stored in a detachable device.

According to one aspect of the present invention there is provided a detachable device that can be attached/detached to/from an electronic apparatus and includes a memory unit, comprising: an analysis unit configured to analyze input data for analysis from the electronic apparatus; a storage unit configured to divide a processing result obtained by the analysis unit into a plurality of partial data and store the partial data in a plurality of areas of the memory unit such that addresses are not continuous; a determination unit configured to determine, based on a parameter included in a read command from the electronic apparatus, whether the read command is a command for reading out the processing result; and an output unit configured to, if it is determined that the read command is the command for reading out the processing result, read out the plurality of partial data from the plurality of areas of the memory unit, construct the partial data to the processing result, and output the processing result.

According to another aspect of the present invention there is provided a control method of a detachable device that can be attached/detached to/from an electronic apparatus and includes a memory unit, comprising: analyzing input data for analysis from the electronic apparatus; dividing a processing result obtained by the analysis into a plurality of partial data and storing the partial data in a plurality of areas of the memory unit such that addresses are not continuous; determining, based on a parameter included in a read command from the electronic apparatus, whether the read command is a command for reading out the processing result; and if it is determined that the read command is the command for reading out the processing result, reading out the plurality of partial data from the plurality of areas of the memory unit, constructing the partial data to the processing result, and outputting the processing result.

According to another aspect of the present invention there is provided a non-transitory computer-readable storage medium that stores a program configured to cause a computer to execute a control method of a detachable device that can be attached/detached to/from an electronic apparatus and includes a memory unit, the control method comprising: analyzing input data for analysis from the electronic apparatus; dividing a processing result obtained by the analysis into a plurality of partial data and storing the partial data in a plurality of areas of the memory unit such that addresses are not continuous; determining, based on a parameter included in a read command from the electronic apparatus, whether the read command is a command for reading out the processing result; and if it is determined that the read command is the command for reading out the processing result, reading out the plurality of partial data from the plurality of areas of the memory unit, constructing the partial data to the processing result, and outputting the processing result.

Further features of the present invention will become apparent from the following description of exemplary embodiments with reference to the attached drawings.

BRIEF DESCRIPTION OF THE DRAWINGS

FIGS. 7A and 7B are views showing the structures of a command and a response;

FIG. 8 is a view schematically showing data in addresses where pieces of information of processing functions are stored;

FIG. 9 is a view showing an example of information obtained by the image capture apparatus;

FIG. 13 is a flowchart showing an example of processing of reading out image data and a processing result according to the second embodiment.

DESCRIPTION OF THE EMBODIMENTS

Figure 1:
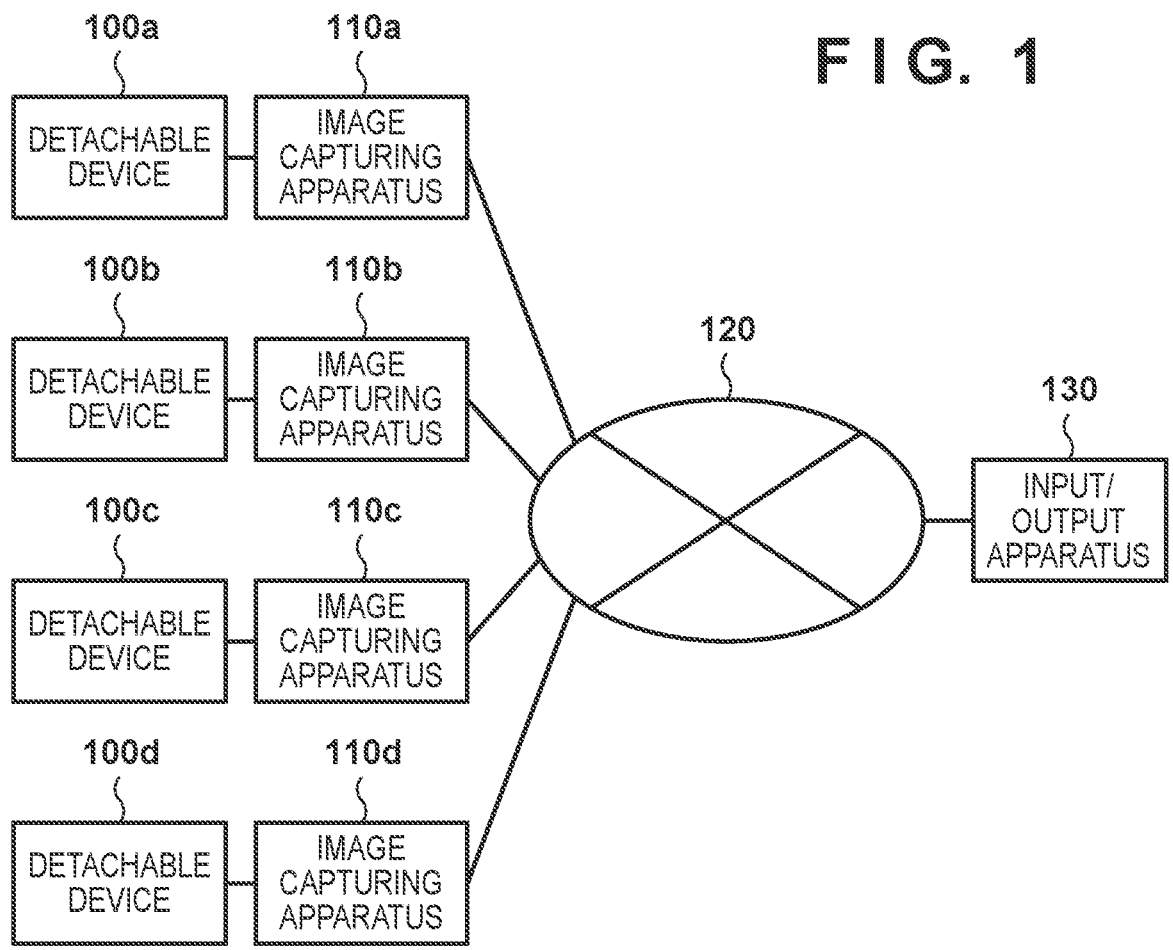
FIG. 1 is a block diagram showing an example of a system arrangement according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An example in which an image capture apparatus is used as an electronic apparatus to which a detachable device is attached will be described below.

<System Arrangement>

FIG. 1 shows an example of the arrangement of an image analysis system according to this embodiment. As an example, a case in which this system is a specific person tracking system will be described below. However, the present invention is not limited to this, and the following argument can be applied to an arbitrary system for analyzing an image and performing predetermined information output. This system is configured to include image capture apparatuses 110a to 110d, a network 120, and an input-output apparatus 130. Note that the image capture apparatuses 110a to 110d each include a slot to/from which a device capable of recording, for example, a captured image can be attached/detached, and when the detachable devices 100a to 100d are inserted into the slots, the image capture apparatuses 110a to 110d are connected to the detachable devices 100a to 100d. Note that the detachable devices 100a to 100d will be referred to as "detachable devices 100", and the image capture apparatuses 110a to 110d will be referred to as "image capture apparatuses 110" hereinafter. Note that "image" is a general term for videos, moving images, and still images.

The detachable device 100 is an arithmetic device attachable/detachable to/from the image capture apparatus 110. As an example, the detachable device 100 is a memory device with a predetermined processing circuit mounted in an SD card. The detachable device 100 is configured to be inserted as a whole into the image capture apparatus 110 in a form of, for example, an SD card, and can therefore be configured to be connectable to the image capture apparatus 110 without making any portion project from the image capture apparatus 110. Alternatively, the detachable device 100 may be configured such that, for example, a half or more of it can be inserted into the image capture apparatus 110, and may therefore be configured to be connectable to the image capture apparatus 110 while making a portion project a little from the image capture apparatus 110. This can prevent the detachable device 100 from interfering with an obstacle such as a wiring and raise the convenience when using the device. In addition, since an SD card slot is prepared in a lot of existing image capture apparatuses 110 such as a network camera, the detachable device 100 can provide an extension function to the existing image capture apparatus 110. Note that other than the form of an SD card, the detachable device 100 may be configured to be attached to the image capture apparatus 110 via an arbitrary interface used when attaching a storage device capable of storing an image captured by at least the image capture apparatus 110. For example, the detachable device 100 may include a USB (Universal Serial Bus) interface, and may be configured to be attached to a USB socket of the image capture apparatus 110. The predetermined processing circuit is implemented by, for example, an FPGA (Field Programmable Gate Array) programmed to execute predetermined processing but may be implemented in another firm.

The image capture apparatus 110 is an image capture apparatus such as a network camera. In this embodiment, the image capture apparatus 110 incorporates an arithmetic apparatus capable of processing an image but is not limited to this. For example, an external computer such as a PC (Personal Computer) connected to the image capture apparatus 110 may exist, and the combination may be handled as the image capture apparatus 110. Additionally, in this embodiment, the detachable devices 100 are attached to all the image capture apparatuses 110. Note that FIG. 1 shows four image capture apparatuses 110, and the detachable devices attached to these. The number of combinations of devices may be three or less, or five or more. When the detachable device 100 having an image analysis processing function is attached to the image capture apparatus 110, image processing can be executed on the side of the image capture apparatus 110 even if the image capture apparatus 110 does not have the image analysis processing function. Also, in a form in which an arithmetic apparatus for image processing is arranged in the image capture apparatus 110, as in this embodiment, image processing executable on the side of the image capture apparatus 110 can be diversified/sophisticated by attaching the detachable device 100 including an arithmetic apparatus to the image capture apparatus 110.

The input-output apparatus 130 is an apparatus that performs acceptance of input from a user and output of information (for example, display of information) to the user. In this embodiment, for example, the input-output apparatus 130 is a computer such as a PC, and information is input and output by a browser or a native application installed in the computer.

The image capture apparatuses 110 and the input-output apparatus 130 are communicably connected via the network 120. The network 120 is configured to include a plurality of routers, switches, cables, and the like, which satisfy the communication standard of for example, Ethernet®. In this embodiment, the network 120 can be an arbitrary network that enables communication between the image capture apparatus 110 and the input-output apparatus 130, and can be constructed by an arbitrary scale and arrangement and a communication standard to comply with. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

<Apparatus Arrangement>

(Arrangement of Image Capture Apparatus)

Figure 2:
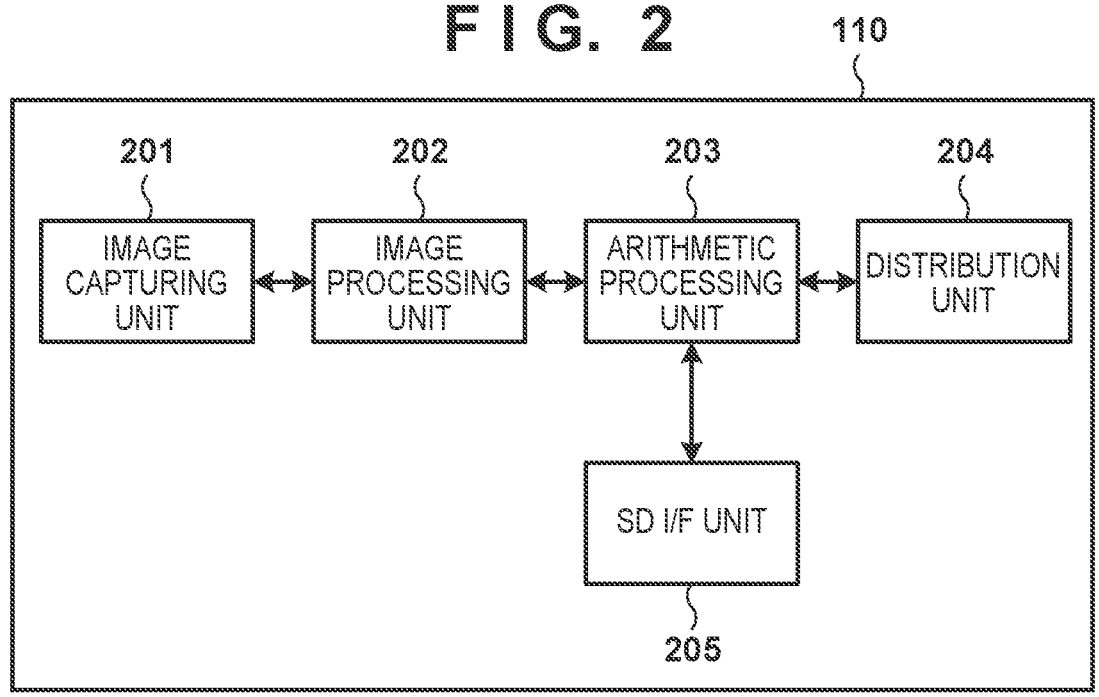
FIG. 2 is a block diagram showing an example of the hardware arrangement of an image capture apparatus.

The arrangement of the image capture apparatus 110 will be described next. FIG. 2 is a block diagram showing an example of the hardware arrangement of the image capture apparatus 110. As the hardware arrangement, the image capture apparatus 110 includes, for example, an image capture unit 201, an image processing unit 202, an arithmetic processing unit 203, a distribution unit 204, and an SD I/F unit 205. Note that I/F is an abbreviation of interface.

The image capture unit 201 is configured to include a lens portion configured to form an image of light, and an image capture element that performs analog signal conversion according to the formed image of light. The lens portion has a zoom function of adjusting an angle of view, a stop function of adjusting a light amount, and the like. The image capture element has a gain function of adjusting sensitivity when converting light into an analog signal. These functions are adjusted based on set values notified from the image processing unit 202. The analog signal obtained by the image capture unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the image capture unit 201, thereby generating image data. The image processing unit 202 can also transmit set values to the lens portion and the image capture element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 can determine allocation concerning which one of the image capture apparatus 110 and the detachable device 100 should execute each portion of processing to be executed in the above-described system, and execute processing corresponding to the allocation. The image received from the image processing unit 202 is transferred to the distribution unit 204 or the SD I/F unit 205. The data of the processing result is also transferred to the distribution unit 204.

The distribution unit 204 is configured to include a network distribution engine and, for example, peripheral devices such as a RAM, and an ETH PHY module. The ETH PRY module is a module that executes processing of the physical (PHY) layer of Ethernet. The distribution unit 204 converts the image data or the data of the processing result obtained from the arithmetic processing unit 203 into a format distributable to the network 120, and outputs the converted data to the network 120. The SD I/F unit 205 is an interface portion used to connect the detachable device 100, and is configured to include, for example, a power supply, and an attachment mechanism such as an attaching/detaching socket used to attach/detach the detachable device 100. Here, the SD I/F unit 205 is configured in accordance with the SD standard formulated by the SD Association. Communication between the detachable device 100 and the image capture apparatus 110, such as transfer of an image obtained from the arithmetic processing unit 203 to the detachable device 100 or data obtaining from the detachable device 100, is performed via the SD I/F unit 205.

Figure 3:
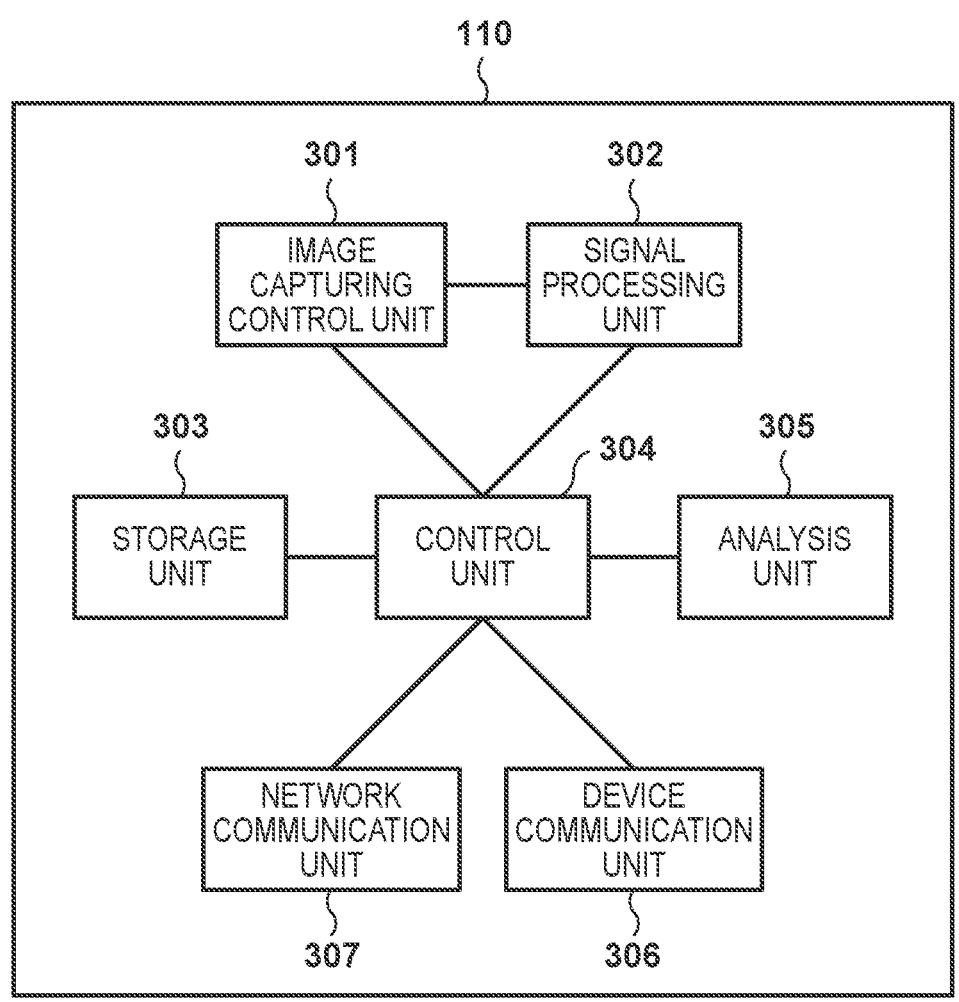
FIG. 3 is a block diagram showing an example of the functional arrangement of the image capture apparatus.

FIG. 3 shows an example of the functional arrangement of the image capture apparatus 110. The image capture apparatus 110 includes, as its functions, for example, an image capture control unit 301, a signal processing unit 302, a memory unit 303, a control unit 304, an analysis unit 305, a device communication unit 306, and a network communication unit 307.

The image capture control unit 301 executes control of capturing the peripheral environment via the image capture unit 201. The signal processing unit 302 performs predetermined processing for the image captured by the image capture control unit 301, thereby generating data of the captured image. The data of the captured image will simply be referred to as the "captured image" hereinafter. The signal processing unit 302, for example, encodes the image captured by the image capture control unit 301. The signal processing unit 302 performs encoding for a still image using, for example, an encoding method such as JPEG (Joint Photographic Experts Group). The signal processing unit 302 performs encoding for a moving image using an encoding method such as H.264/MPEG-4 AVC (to be referred to as "H.264" hereinafter) or HEVC (High Efficiency Video Coding). The signal processing unit 302 may encode an image using an encoding method selected by the user from a plurality of encoding methods set in advance via, for example, an operation unit (not shown) of the image capture apparatus 110.

The memory unit 303 stores a result of analysis processing to be described later. Note that in this embodiment, processing to be executed is analysis processing. However, arbitrary processing may be executed. The control unit 304 controls the signal processing unit 302, the memory unit 303, the analysis unit 305, the device communication unit 306, and the network communication unit 307 to execute predetermined processing.

The analysis unit 305 selectively executes at least one of pre-analysis processing, analysis processing, and post-analysis processing for a captured image. Pre-analysis processing is processing to be executed for a captured image before analysis processing to be described later is executed. In the pre-analysis processing according to this embodiment, as an example, processing of dividing a captured image to create divided images is executed. Analysis processing is processing of outputting information obtained by analyzing an input image. In the analysis processing according to this embodiment, as an example, processing of receiving a divided image obtained by pre-analysis processing, executing at least one of human body detection processing, face detection processing, and vehicle detection processing, and outputting the analysis processing result is executed. The analysis processing can be processing configured to output the position of an object in a divided image using a machine learning model that has learned to detect an object included in an image using, for example, the technique of non-patent literature 1. Post-analysis processing is processing to be executed after analysis processing is executed. In the post-analysis processing according to this embodiment, as an example, processing of outputting, as a processing result, a value obtained by adding the numbers of objects detected in the divided images based on the analysis processing result for each divided image is executed. Note that the analysis processing may be processing of detecting an object in an image by performing pattern matching and outputting the position of the object.

The device communication unit 306 performs communication with the detachable device 100. The device communication unit 306 converts input data into a format processible by the detachable device 100, and transmits data obtained by the conversion to the detachable device 100. In addition, the device communication unit 306 receives data from the detachable device 100, and converts the received data into a format processible by the image capture apparatus 110. In this embodiment, as the conversion processing, the device communication unit 306 executes processing of converting a decimal between a floating point format and a fixed point format. However, the present invention is not limited to this, and another processing may be executed by the device communication unit 306. Additionally, in this embodiment, the device communication unit 306 transmits a command sequence determined in advance within the range of the SD standard to the detachable device 100, and receives a response from the detachable device 100, thereby performing communication with the detachable device 100. The network communication unit 307 performs communication with the input-output apparatus 130 via the network 120.

(Arrangement of Detachable Device)

Figure 4:
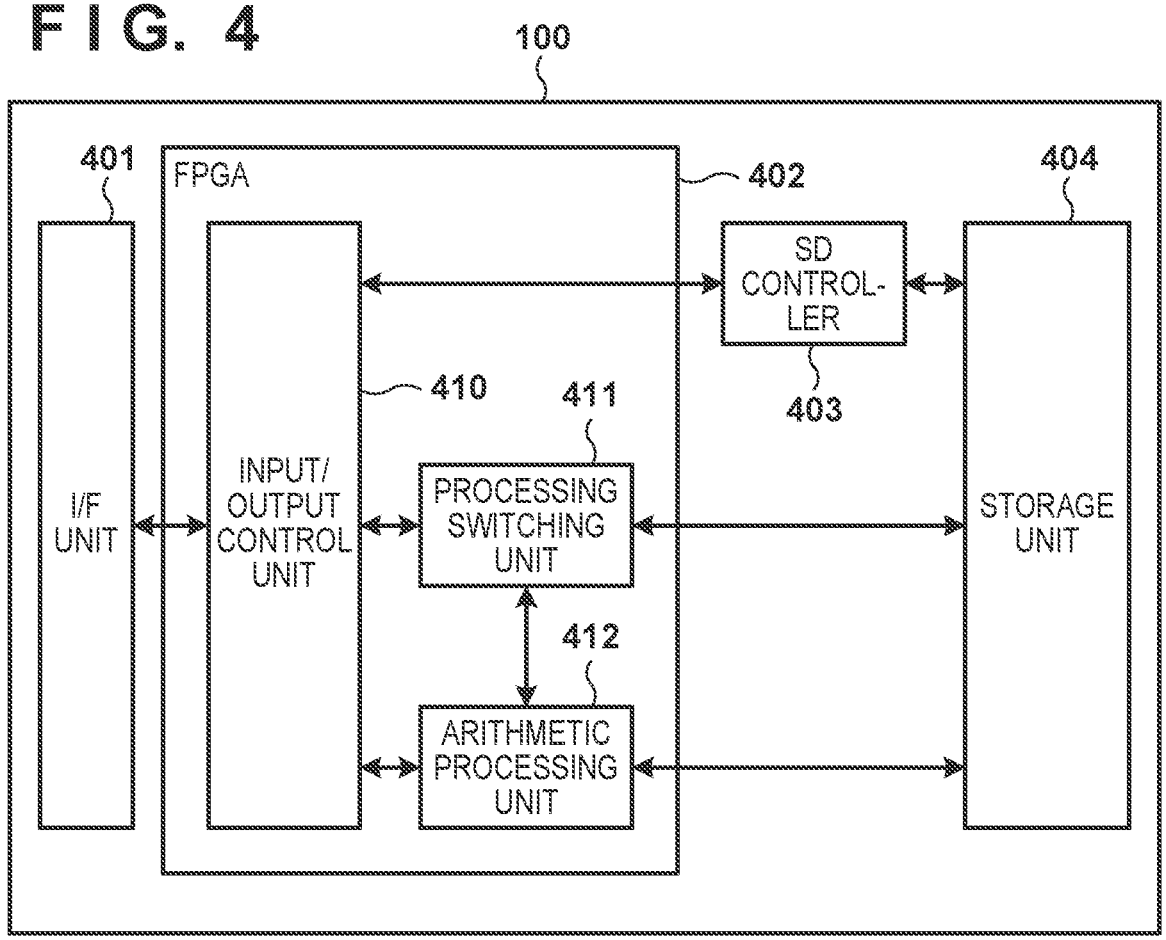
FIG. 4 is a block diagram showing an example of the hardware arrangement of a detachable device.

FIG. 4 is a block diagram showing an example of the hardware arrangement of the detachable device 100. As an example, the detachable device 100 is configured to include an I/F unit 401, an FPGA 402, an SD controller 403, and a memory unit 404. The detachable device 100 is formed into a shape that can be inserted/removed into/from the attaching/detaching socket of the SD I/F unit 205 provided in the image capture apparatus 110, that is, a shape complying with the SD standard.

The I/F unit 401 is an interface portion used to connect an apparatus such as the image capture apparatus 110 and the detachable device 100. The I/F unit 401 is configured to include, for example, an electrical contact terminal that receives supply of power from the image capture apparatus 110 and generates and distributes a power supply to be used in the detachable device 100, and the like. Concerning items defined in (complying with) the SD standard, the I/F unit 401 complies with that, like the SD I/F unit 205 of the image capture apparatus 110. Reception of images and setting data from the image capture apparatus 110 and transmission of data from the FPGA 402 to the image capture apparatus 110 are executed via the I/F unit 401.

The FPGA 402 is configured to include an input-output control unit 410, a process switching unit 411, and an arithmetic processing unit 412. The FPGA 402 is a kind of semiconductor device capable of repetitively reconfiguring an internal logic circuit structure. By processing implemented by the FPGA 402, a processing function can be added (provided) to the apparatus to which the detachable device 100 is attached. Additionally, since the logic circuit structure can be changed later by the reconfiguration function of the FPGA 402, when the detachable device 100 is attached to, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be implemented. The FPGA 402 is activated by writing, from a dedicated I/F, setting data including the information of a logic circuit structure to be generated or reading out the setting data from the dedicated I/F. In this embodiment, the setting data is held in the memory unit 404. When powered on, the FPGA 402 reads out the setting data from the memory unit 404 and generates and activates a logic circuit. However, the present invention is not limited to this. For example, the image capture apparatus 110 may write the setting data in the FPGA 402 via the I/F unit 401 by implementing a dedicated circuit in the detachable device.

The input-output control unit 410 is configured to include a circuit used to transmit/receive an image to/from the image capture apparatus 110, a circuit that analyzes a command received from the image capture apparatus 110, a circuit that controls based on a result of analysis, and the like. Commands here are defined by the SD standard, and the input-output control unit 410 can detect some of them. Details of the functions will be described later. The input-output control unit 410 controls to transmit an image to the SD controller 403 in storage processing and transmit an image to the arithmetic processing unit 412 in image analysis processing. If the setting data of switching of processing is received, the input-output control unit 410 transmits the setting data to the process switching unit 411. The process switching unit 411 is configured to include a circuit configured to obtain the information of the image analysis processing function from the memory unit 404 based on the setting data received from the image capture apparatus 110 and write the information in the arithmetic processing unit 412. The information of the image analysis processing function includes setting parameters representing, for example, the order and types of operations processed in the arithmetic processing unit 412, the coefficients of operations, and the like.

The arithmetic processing unit 412 is configured to include a plurality of arithmetic circuits needed to execute the image analysis processing function. The arithmetic processing unit 412 executes each arithmetic processing based on the information of the image analysis processing function received from the process switching unit 411, transmits the processing result to the image capture apparatus 110, and/or records the processing result in the memory unit 404. As described above, the FPGA 402 extracts the setting data of an execution target processing function included in setting data corresponding to a plurality of processing functions held in advance, and rewrites processing contents to be executed by the arithmetic processing unit 412 based on the extracted setting data. This allows the detachable device 100 to selectively execute at least one of the plurality of processing functions. In addition, by appropriately adding setting data of processing to be newly added, latest processing can be executed on the side of the image capture apparatus 110. Note that holding a plurality of setting data corresponding to a plurality of processing functions will be referred to as holding a plurality of processing functions hereinafter. That is, even in a state in which the FPGA 402 of the detachable device 100 is configured to execute one processing function, if the processing contents of the arithmetic processing unit 412 can be changed by setting data for another processing function, this will be expressed as holding a plurality of processing functions.

The SD controller 403 is a known control IC (Integrated Circuit) as defined by the SD standard, and executes control of a slave operation of an SD protocol and control of data read/write for the memory unit 404. The memory unit 404 is formed by, for example, a NAND flash memory, and stores various kinds of information such as storage data written from the image capture apparatus 110, the information of the image analysis processing function written in the arithmetic processing unit 412, and setting data of the FPGA 402. Note that data write and read for the memory unit 404 are performed using a block as a unit (having a size of, for example, 512 bytes).

Figure 5:
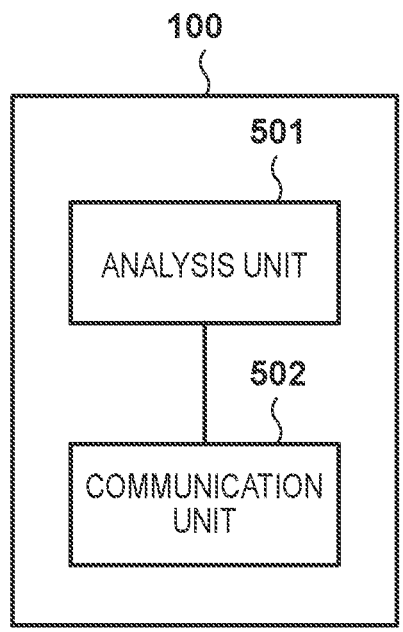
FIG. 5 is a block diagram showing an example of the functional arrangement of the detachable device.

FIG. 5 shows an example of the functional arrangement of the detachable device 100. The detachable device 100 includes, as its functional arrangement, for example, an analysis unit 501 and a communication unit 502. The analysis unit 501 executes analysis processing for an image. For example, if an analysis processing setting request is input, the analysis unit 501 executes setting to set the input analysis processing in an executable state. If an image is input, the analysis unit 501 executes the analysis processing set in the executable state for the input image. In this embodiment, executable analysis processing includes human body detection processing and face detection processing but is not limited to these. For example, it may be processing (face authentication processing to be described later) of determining whether a person stored in advance is included in an image. For example, if the degree of matching between the image characteristic amount of a person stored in advance and the image characteristic amount of a person detected from an input image is calculated, and the degree of matching is equal to or larger than a threshold, it is determined that the person is the person stored in advance. Alternatively, it may be processing of superimposing a predetermined mask image or performing mosaic processing on a person detected from an input image for the purpose of privacy protection. It may be processing of detecting, using a learning model that has learned a specific action of a person by machine learning, whether a person in an image is taking the specific action. Furthermore, it may be processing of determining what kind of region a region in an image is. It may be processing of determining, using, for example, a learning model that has learned buildings, roads, persons, sky and the like by machine learning, what kind of region a region in an image is. As described above, executable analysis processing can be applied to both image analysis processing using machine learning and image analysis processing without using machine learning. Each analysis processing described above may be executed not independently by the detachable device 100 but in cooperation with the image capture apparatus 110. The communication unit 502 performs communication with the image capture apparatus 110 via the I/F unit 401.

The input-output apparatus 130 is formed as a computer such as a general PC, and, for example, can execute various kinds of functions by executing, by a processor, programs stored in a memory and a storage device.

<Procedure of Processing>

An example of the procedure of processing executed in the system will be described next. Note that processing executed by the image capture apparatus 110 in the following processes is implemented by, for example, by a processor in the arithmetic processing unit 203, executing a program stored in a memory or the like. However, this is merely an example, and processing to be described later may partially or wholly be implemented by dedicated hardware. In addition, processing executed by the detachable device 100 or the input-output apparatus 130 may also be implemented by, by a processor in each apparatus, executing a program stored in a memory or the like, and processing may partially or wholly be implemented by dedicated hardware.

(Overall Procedure)

Figure 6:
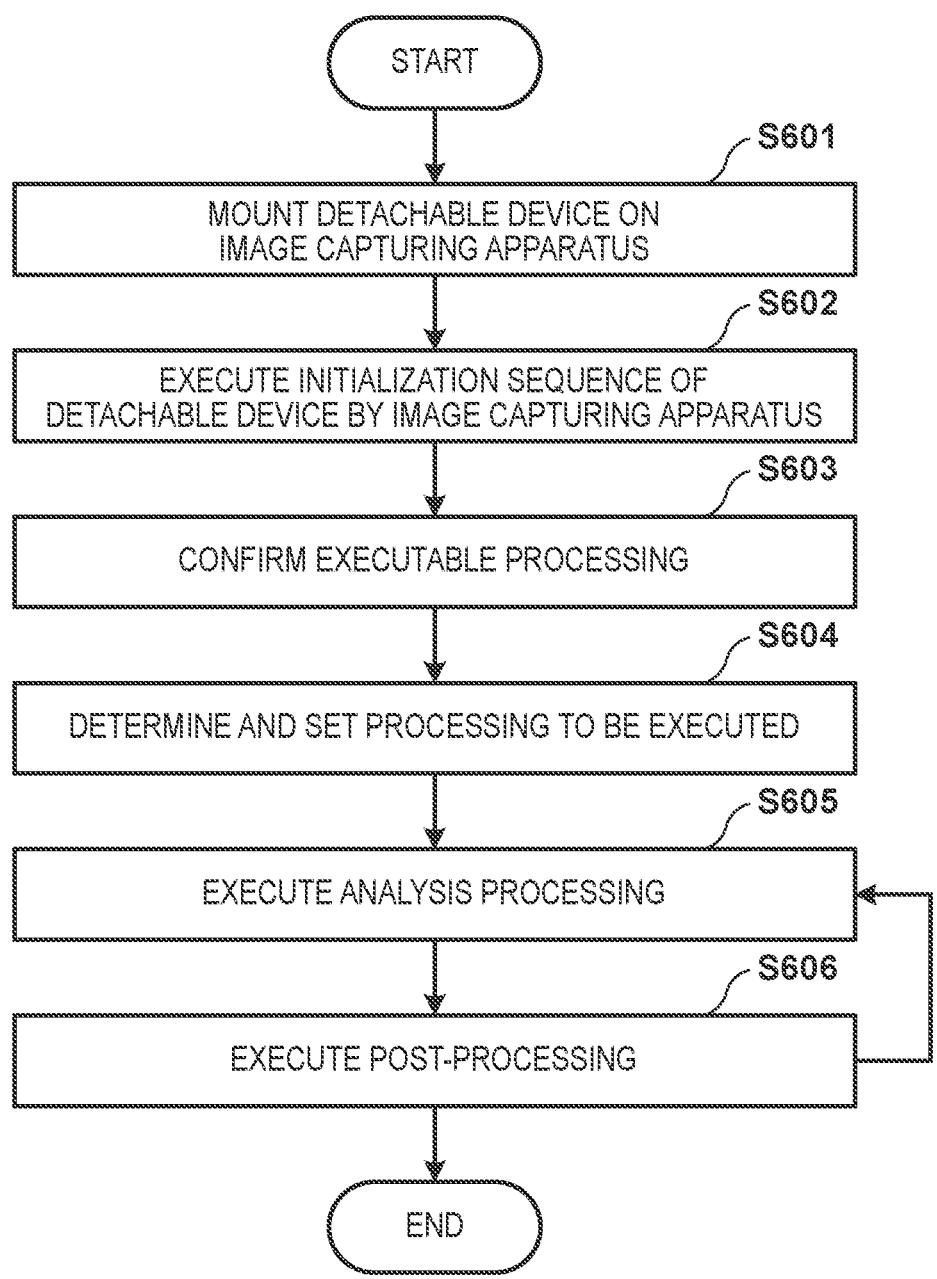
FIG. 6 is a flowchart showing an example of processing executed by the system.

FIG. 6 schematically shows a series of procedures of image analysis processing executed by the system. In this processing, first, the user attaches the detachable device 100 to the image capture apparatus 110 (step S601). The image capture apparatus 110 executes an initialization sequence of the detachable device 100 (step S602). In this initialization sequence, predetermined commands are transmitted/received between the image capture apparatus 110 and the detachable device 100, and the image capture apparatus 110 thus makes detachable device 100 usable. After that, the image capture apparatus 110 confirms processing executable by the detachable device 100, and confirms processing that can be executed locally (that can be executed only by the image capture apparatus 110 or by the combination of the image capture apparatus 110 and the detachable device 100) (step S603). Note that although the detachable device 100 can be configured to execute arbitrary processing, processing irrelevant to processing that should be executed on the side of the image capture apparatus 110 need not be taken into consideration. In an example, the image capture apparatus 110 may hold a list of executable processes, which is obtained in advance from, for example, the input-output apparatus 130. In this case, when obtaining, from the detachable device 100, information representing processing executable by the detachable device 100, the image capture apparatus 110 can confirm only the executable processing depending on whether the processing is included in the list.

Next, the image capture apparatus 110 determines processing to be executed, and executes setting of the detachable device 100 as needed (step S604). That is, if at least part of processing determined as an execution target is to be executed by the detachable device 100, setting of the detachable device 100 for the processing is executed, in this setting, for example, reconfiguration of the FPGA 402 using setting data corresponding to the processing of the execution target can be performed. Then, the image capture apparatus 110 or the detachable device 100 executes analysis processing (step S605). After that, the image capture apparatus 110 executes post-processing (step S606). Note that the processes of steps S605 and S606 are repetitively executed. The processing shown in FIG. 6 is executed when, for example, the detachable device 100 is attached. However, at least part of the processing shown in FIG. 6 may repetitively be executed such that, for example, the process of step S603 is executed again when the detachable device 100 is detached.

Steps S603 to S606 will be described in more detail. In step S603, the control unit 304 of the image capture apparatus 110 reads out a first processing list that is a list of processes executable by the analysis unit 305 of the image capture apparatus 110 itself and is stored in the memory unit 303. Next, the control unit 304 controls the device communication unit 306 to issue a read request (read command) to a specific address of the attached detachable device 100. The specific address will sometimes be referred to as the "address A" hereinafter. Note that details of data stored at the address A will be described later. The control unit 304 generates a list (second processing list) of processing functions held by the detachable device 100 based on the data read out from the address A.

The input-output apparatus 130 obtains the first processing list and the second processing list from the image capture apparatus 110 via the network, and presents these to the user via screen display or the like. The user selects analysis processing (to be referred to as "execution target processing" hereinafter) to be executed from the displayed lists. The input-output apparatus 130 notifies the image capture apparatus 110 of the selection result of execution target processing.

In step S604, if the execution target processing is included in the second processing list, the control unit 304 controls the device communication unit 306 to transmit an execution target processing setting request to the detachable device 100. The communication unit 502 of the detachable device 100 receives the execution target processing setting request from the image capture apparatus 110. The communication unit 502 outputs the execution target processing setting request received from the image capture apparatus 110 to the analysis unit 501. Based on the execution target processing setting request input from the communication unit 502, the analysis unit 501 executes setting to set a state in which the detachable device 100 can execute the execution target processing. For example, the process switching unit 411 switches the execution target processing of the arithmetic processing unit 412 in accordance with the setting request. For example, after the setting processing is completed, the communication unit 502 transmits a setting completion notification to the image capture apparatus 110.

In step S605, if the execution target processing is included in the second processing list, the control unit 304 controls the device communication unit 306 to transmit an analysis processing target image to the detachable device 100. For example, the control unit 304 issues a write request (write command) for the analysis processing target image, thereby transmitting the analysis processing target image to the detachable device 100. The communication unit 502 of the detachable device 100 receives the analysis processing target image from the image capture apparatus 110, and outputs the image received from the image capture apparatus 110 to the analysis unit 501. The analysis unit 501 executes the execution target processing set in step S604 for the image input from the communication unit 502, and stores the image in the memory unit 404.

After that, in step S606, in accordance with an analysis processing result read request (read command) from the image capture apparatus 110, the communication unit 502 reads out the analysis processing result obtained by the processing of the analysis unit 501 from the memory unit 404, and transmits the analysis processing result to the image capture apparatus 110. The control unit 304 of the image capture apparatus 110 controls the device communication unit 306 to receive the analysis processing result from the detachable device 100. After that, the control unit 304 controls the analysis unit 305 to execute post-analysis processing for the analysis processing result.

(Communication Between Image Capture Apparatus 110 and Detachable Device 100)

Interface Configuration of Detachable Device

Communication between the image capture apparatus 110 and the detachable device 100 will be described here. The arithmetic processing unit 203 of the image capture apparatus 110 and the SD controller 403 of the detachable device 100 are connected by a power supply line, a GND line, a clock line, a command line, and a data line via the device insertion socket of the SD I/F unit 205 of the image capture apparatus 110. Note that the clock line, the command line, and the data line are connected via the FPGA 402. On the clock line, a synchronization clock output from the arithmetic processing unit 203 is communicated. On the command line, a command issued for an operation request from the arithmetic processing unit 203 to the SD controller 403 and a response to the command from the SD controller 403 to the arithmetic processing unit 203 are communicated. On the data line, write data from the arithmetic processing unit 203 and read data from the detachable device 100 are communicated. In addition, the arithmetic processing unit 203 discriminates whether a device detect signal of the device insertion socket of the SD I/F unit 205 is High and Low, thereby recognizing whether the detachable device 100 is inserted.

Initialization of Detachable Device

The arithmetic processing unit 203 issues a command to the SD controller 403 on the command line after power supply. Upon receiving a response from the SD controller 403 and output data representing device information as an SD card, the arithmetic processing unit 203 sets a voltage for data communication, a communication speed (clock frequency), and the like.

Structures of Command and Response

FIGS. 7A and 7B show examples of the structures of a command and a response communicated on the command line. The command and response have structures complying with the SD standard. A command 701 issued from the arithmetic processing unit 203 to the SD controller 403 is configured to include a command number portion 704, a command argument portion 705, and an error correction data portion 706. In the command number portion 704, a value indicating the type of the command is described. For example, if a value "23" is stored in the command number portion 704, this indicates that the command is a block count designation command for designating the number of data blocks. If a value "25" is stored in the command number portion 704, this indicates that the command is a multi-write command. If a value "12" is stored in the command number portion 704, this indicates that the command is a data transfer stop command. In the command argument portion 705, pieces of information such as the number of transfer data blocks and the write/read address of a memory are designated in accordance with the type of the command. A command start bit 702 representing the start position of the command is added to the first bit of the command, and a command end bit 707 representing the end of the command is added to the final bit of the command. Additionally, a direction bit 703 representing that the command is a signal output from the image capture apparatus 110 to the detachable device 100 is also added after the command start bit 702.

A response 711 returned from the SD controller 403 in response to the command from the arithmetic processing unit 203 includes a response number portion 714 representing for which command the response is returned, a response argument portion 715, and an error correction data portion 716. A response start bit 712 representing the start position of the response is added to the first bit of the response, and a response end bit 717 representing the end position of the response is added to the final bit of the response. Additionally, a direction bit 713 representing that the response is a signal output from the detachable device 100 to the image capture apparatus 110 is also added after the response start bit 712. In the response argument portion 715, pieces of information such as the status of the SD card are stored in accordance with the command type.

Transfer of Data

A method of transmitting/receiving data between the arithmetic processing unit 203 and the detachable device 100 will be described next. As described above, in the SD I/F unit 205, data transfer is performed on a block basis in both data write and read. A block is a unit of data write and read in the memory unit 404 and has a size of, for example, 512 bytes.

The following two methods are used by the arithmetic processing unit 203 to transfer the data of a plurality of blocks to the detachable device 100. In the first method, after the number of blocks is designated by a block count designation command for transfer data, data of the designated number of blocks are transferred by a multi-write command. In the block count designation command, the number of blocks of write data is designated by the command argument portion 705. In the multi-write command, the address of the memory unit 404 at which the data should be written is designated by the command argument portion 705. In the second method, data transfer is started by issuing a multi-write command without issuing a block count designation command. When the data transfer ends, a transfer stop command is issued, thereby ending the processing. At this time, the command argument portion 705 of the multi-write command designates only the address of the memory unit 404 at which the data should be written. Note that in both writes, the SD controller 403 starts the write from the address designated by the multi-write command, and increments the write address every time data of one block is input, thereby writing data in the memory unit 404. The arithmetic processing unit 203 can arbitrarily switch the two write methods.

Note that when performing storage processing, the FPGA 402 directly inputs a command and data sent from the arithmetic processing unit 203 to the SD controller 403, and the SD controller 403 stores the received data at the address of the memory unit 404 designated by the command. When performing image analysis processing, the FPGA 402 executes analysis processing for data sent from the arithmetic processing unit 203, and outputs the data of the processing result and information for designating a predetermined address of the memory unit 404 to the SD controller 403. The SD controller 403 stores the processing result at the designated address of the memory unit.

The following two methods are used by the arithmetic processing unit 203 to read out the data of a plurality of blocks from the detachable device 100. In the first method, after the number of blocks is designated by a block count designation command, a multi-read command is issued, and data of the designated number of blocks are read out. In the block count designation command, the number of blocks of read data is designated by the command argument portion 705. The command argument portion 705 of the multi-read command designates the address of the memory of the data read source. In the second method, data read is started by issuing a multi-read command without issuing a block count designation command, and the processing is ended by issuing a transfer stop command. Note that in both reads, the SD controller 403 starts the read from the address designated by the multi-read command, and increments the read address every time data of one block is output, thereby reading out data stored in the memory unit 404. The arithmetic processing unit 203 can arbitrarily switch the two read methods.

Note that if write data or read data is data of one block, a single-write command or a single-read command is issued, thereby executing data write or read without issuing a block count designation command and a transfer stop command. In the single-write command and the single-read command as well, the command argument portion 705 designates the address of the memory unit 404 of the access target, as in the above description.

The arithmetic processing unit 203 performs write to the detachable device 100, thereby transmitting data as the target of storage processing or image analysis processing to the detachable device 100. In addition, the arithmetic processing unit 203 performs read from the detachable device 100, thereby obtaining image data stored in the memory unit 404, a processing result of image analysis processing, and the information of the image analysis processing function held by the detachable device 100.

Confirmation of Information of Image Analysis Processing Function

The detachable device 100 according to this embodiment stores the information of a processing function held by the self-device at the specific address A of the memory unit 404. The arithmetic processing unit 203 of the image capture apparatus 110 can confirm the information of a processing function held by the detachable device 100 by issuing a multi-read command or a single-read command to the address A. The information of a processing function here includes information representing whether the device holds the processing function, a time required until completion when the processing is executed, the data size of a processing result, and the information of an address at which the processing result is stored. FIG. 8 shows an example of the information of processing functions. A processing function holding flag 801 represents that the detachable device 100 has image analysis processing functions. The image capture apparatus 110 confirms the processing function holding flag 801, thereby determining whether the detachable device 100 has image analysis processing functions. A processing function classification 802 represents analysis processing held by the detachable device 100. An input data size 803 and a processing data count (input data count) 804 represent information concerning the data input specifications of each processing function. An estimated processing time 805 represents a time needed from data input to processing result output, and a processing result data count 806 represents the number of data of a processing result. A processing result storage address (analysis result storage address) 807 represents a location where the processing result is stored in the memory unit 404. The arithmetic processing unit 203 reads out the data at the address A of the memory unit 404 as shown in FIG. 8, thereby obtaining a processing function table as shown in FIG. 9. Note that in this specification, the number of data is the number of blocks corresponding to the amount of data (the size of data).

If a read command to the address A is not issued by the arithmetic processing unit 203, the detachable device 100 determines that the apparatus to which the self-device is attached is an apparatus that does not use an image analysis processing function. In this case, concerning data to be transferred, the detachable device 100 can execute only storage processing for the memory unit 404. Hence, for an apparatus that does not need an image analysis processing function, the detachable device 100 can function only as a memory device. A method of storing the information of processing functions at the specific address A of the memory unit 404 has been described here. However, the present invention is not limited to this. For example, the information of processing functions may be added to the response argument portion 715 in a response to a command that is used at the time of initialization of the detachable device 100.

Note that the image capture apparatus 110 executes read of the address A of the memory unit 404, for example, after the end of initialization of the detachable device 100. In addition, the image capture apparatus 110 discards the read information if the device is not detected in the socket any more. If the device is inserted into the socket after the information is discarded, the image capture apparatus 110 reads out the value of the address A again after the end of initialization. Hence, if a different detachable device is inserted, the image capture apparatus 110 can read and set the information of functions held by the detachable device.

<Processing of Distributed Storage and Combination Read of Processing Result>

Figure 10:
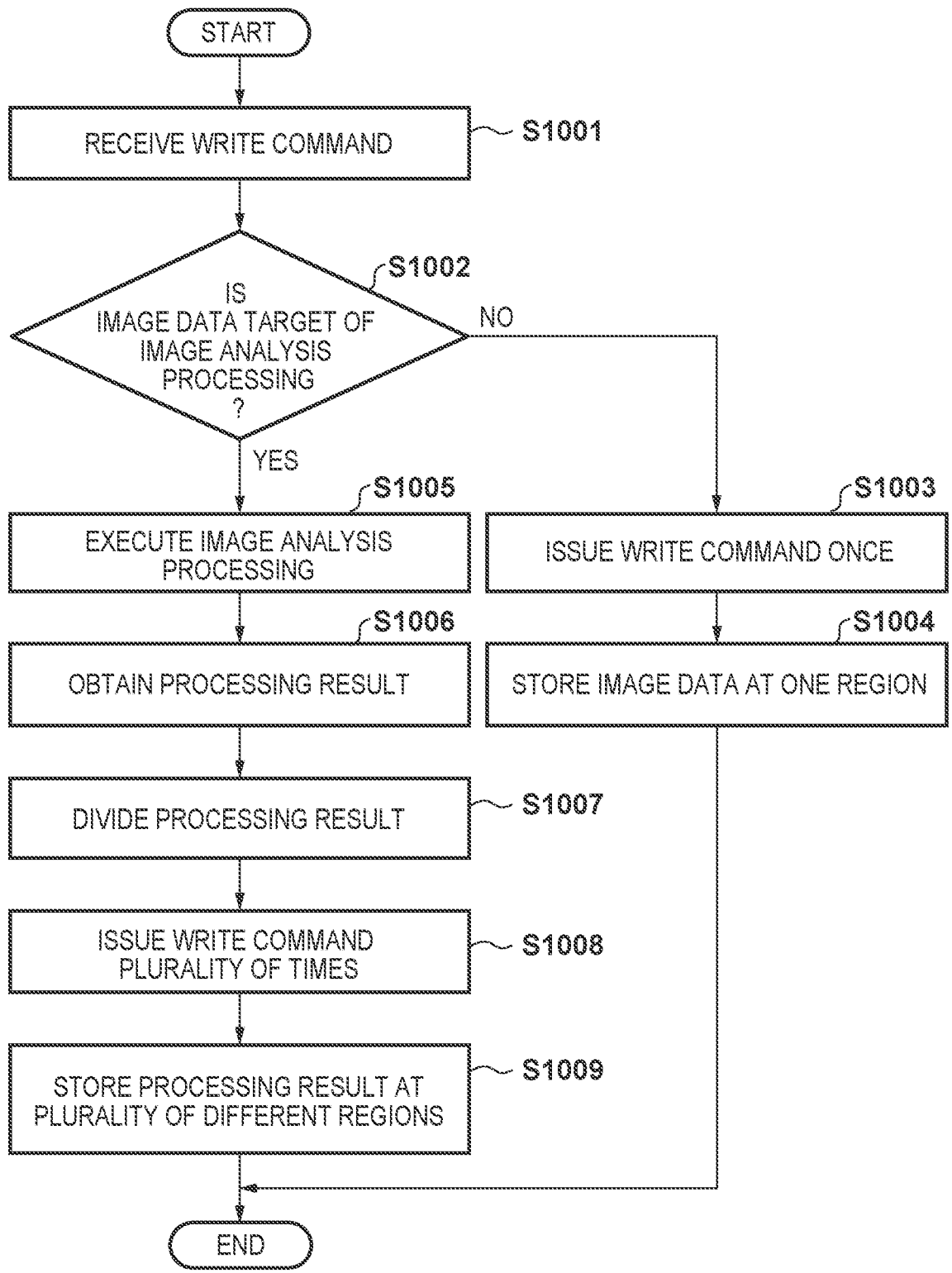
FIG. 10 is a flowchart showing an example of processing of storing image data and a processing result.
Figure 11:
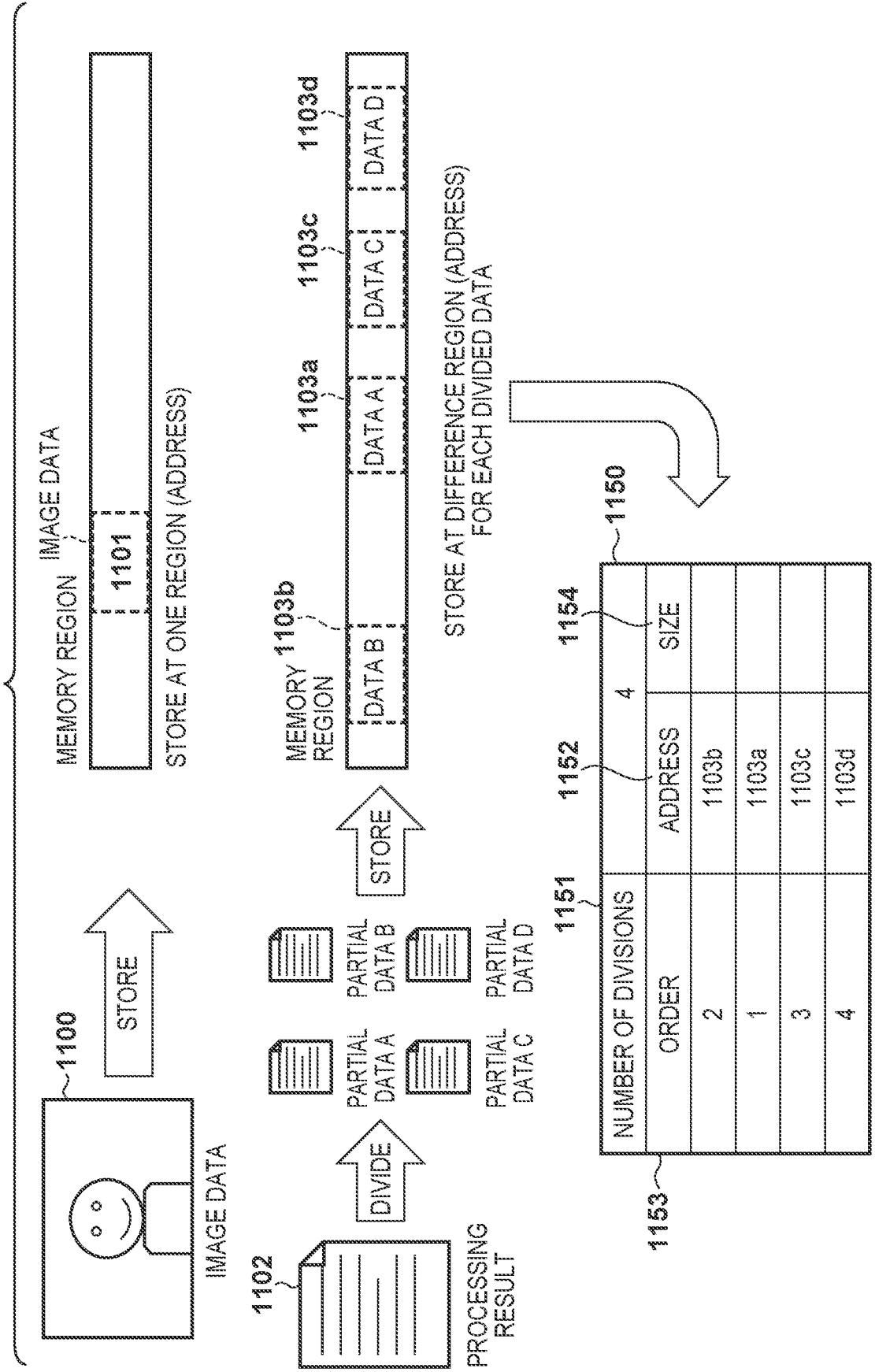
FIG. 11 is a view for explaining storage of image data and a processing result of analysis processing.

A method of distributedly storing a processing result of image analysis processing on the detachable device 100 in the memory unit 404 of the detachable device 100 will be described next with reference to FIGS. 10 and 11. FIG. 10 is a flowchart for explaining data storage processing by the detachable device 100. FIG. 11 is a view for explaining storage of image data and an analysis processing result by the detachable device 100.

The input-output control unit 410 of the FPGA 402 receives a write command used to transfer image data from the image capture apparatus 110 via the I/F unit 401 (step S1001). The write command is, for example, issued by the arithmetic processing unit 203, transmitted to the detachable device 100 via the SD I/F unit 205, and received by the I/F unit 401. The FPGA 402 confirms a command type represented by the command number portion 704 of the received write command and the contents of the command argument portion 705, and determines whether the image data to be transferred is a target of image analysis processing (step S1002).

If it is determined in step S1002 that the image data is not a target of image analysis processing, the FPGA 402 performs storage processing. That is, the FPGA 402 issues a command to the SD controller 403 such that the image data is stored at the address designated by the write command issued from the image capture apparatus 110 (step S1003). A write command issued from the image capture apparatus 110 will sometimes be referred to as an external write command, and a write command issued by the FPGA 402 to the SD controller 403 will sometimes be referred to as an internal write command hereinafter. The internal write command issued in step S1003 instructs to store image data 1100 transferred from the image capture apparatus 110 at an address 1101 designated by the external write command. For example, the FPGA 402 issues a write command that is the same as the external write command issued from the arithmetic processing unit 203 to the SD controller 403 once (step S1004). For example, as shown in FIG. 11, the image data 1100 is transmitted to the SD controller 403 in a form as transmitted from the arithmetic processing unit 203, and the SD controller 403 stores the image data 1100 at the address 1101 of the memory unit 404 designated by the write command.

On the other hand, if it is determined in step S1002 that the image data to be transferred is a target of image analysis processing, the FPGA 402 provides the image data transferred from the image capture apparatus 110 to the arithmetic processing unit 412, executes image analysis processing (step S1005), and obtains the processing result 1102 (step S1006). The FPGA 402 divides the processing result obtained by image analysis processing into a plurality of partial data (step S1007), and stores the partial data in the memory unit 404 such that the addresses do not continue (steps S1008 and S1009).

For example, in FIG. 11, if it is determined that the image data 1100 is a target of image analysis processing, the FPGA 402 executes image analysis processing for the image data 1100 (step S1005), and obtains a processing result 1102 (step S1006). Next, the FPGA 402 divides the obtained processing result 1102 into a plurality of partial data A to D (step S1007). The FPGA 402 issues a write command to the SD controller 403 such that the partial data are stored in the memory unit 404 without continuing the addresses. That is, the FPGA 402 issues write commands as many as the number of divided processing results (the number of partial data), which designate different addresses 1103a to 1103d, to the SD controller 403 a plurality of times (step S1008). In accordance with the plurality of issued write commands, the SD controller 403 stores the divided processing results (partial data A to D) at the designated addresses 1103a to 1103d (step S1009).

Note that the plurality of addresses used to store the partial data are generated such that the addresses of the storage destinations of the plurality of partial data do not continue. As for the generation method, for example, the addresses can be generated based on random values. Also, the FPGA 402 stores the number 1151 of divisions of processing results, an address 1152 at which a processing result is stored, and an order 1153 of storage in an internal memory or a predetermined area of the memory unit 404 as a processing result division table 1150 (FIG. 11). The size of each partial data may be a predetermined value or may be set for each image analysis, or the partial data may have different sizes. The size of each partial data may be recorded in the processing result division table (size 1154).

Figure 12:
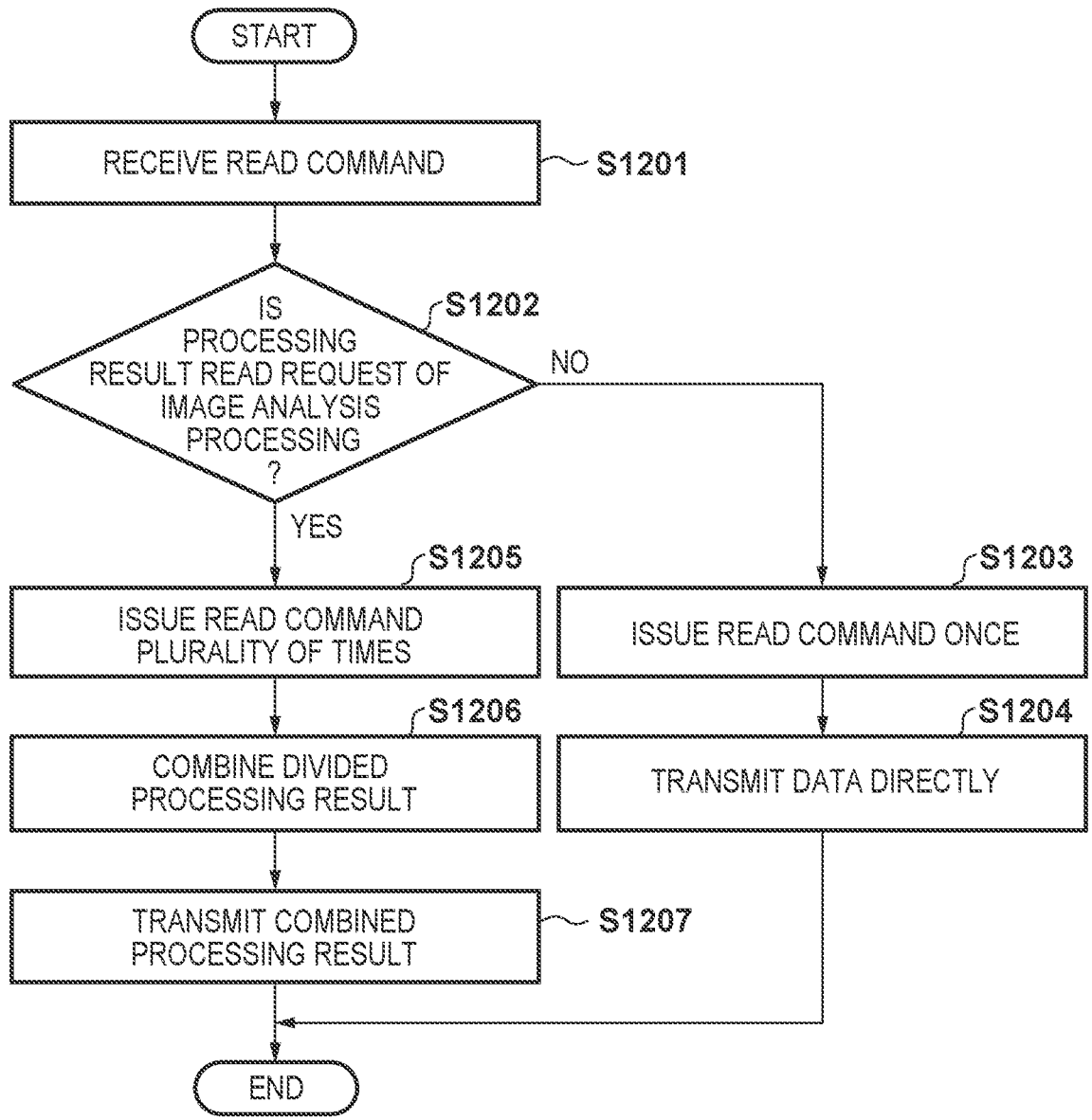
FIG. 12 is a flowchart showing an example of processing of reading out image data and a processing result according to the first embodiment.

A method of reading out and combining processing results of image analysis processing will be described next with reference to FIG. 12. The FPGA 402 of the detachable device 100 receives a read command issued from the arithmetic processing unit 203 via the I/F unit 401 (step S1201). The FPGA 402 determines, based on a parameter included in the read command, whether the received read command is a read command for requesting read of a processing result of image analysis processing (step S1202). To read out a processing result of image analysis processing, the arithmetic processing unit 203 performs designations such that, for example, the number of read data matches the number of data of processing results of image analysis processing, and a read address matches a storage address of the processing result. The number of data of processing results and the storage addresses of the processing results can be obtained from the processing result division table shown in FIG. 9. A read command in which the number of read data matches the number of data of processing results, and a read address matches a storage address of the processing result will also be referred to as a processing result read request hereinafter. The FPGA 402 confirms whether the number of data blocks and the read address designated by the read command match the number of data of processing results and the storage address of the processing result, respectively, and determines whether the read command is a processing result read request. Note that the FPGA 402 can obtain the number of data blocks and the read address by reading the values of the command argument portions 705 in a block designation command and a multi-read command.

If it is determined that the read command received in step S1201 is not a processing result read request, the FPGA 402 issues a read command corresponding to the read command issued by the arithmetic processing unit 203 once to the SD controller 403 (step S1203). A read command issued by the image capture apparatus will also be referred to as an external read command, and a read command issued by the FPGA 402 will also be referred to as an internal read command. In accordance with the issued read command, the SD controller 403 reads out, from the memory unit 404, the data of the designated address as many as the designated number of blocks. The FPGA 402 transmits the read data directly from the I/F unit 401 to the arithmetic processing unit 203 (step S1204). In this way, the detachable device 100 transmits the data requested to be read out by the external read command to the image capture apparatus 110.

If it is determined in step S1202 that the read command is a processing result read request, the FPGA 402 obtains a plurality of addresses at which a plurality of divided partial data are stored from the stored processing result division table. The FPGA 402 issues a plurality of internal read commands for designating the plurality of addresses to the SD controller 403, thereby obtaining the plurality of partial data from the memory unit 404 (step S1205). At this time, the addresses set in the internal read commands are obtained from the processing result division table 1150. If a data size needs to be designated in the read command, the size 1154 in the processing result division table 1150 can be referred to. In the example shown in FIG. 11, four read commands for designating the addresses 1103a to 1103d are issued, and the partial data A to D are obtained.

The FPGA 402 combines the readout partial data A to D while referring to the "order" recorded in the processing result division table 1150, thereby generating the processing result before division (step S1206). In the example shown in FIG. 11, the data A to D are reconstructed into the original processing result 1102, After that, the FPGA 402 transmits the reconstructed processing result 1102 to the arithmetic processing unit 203 via the I/F unit 401 (step S1207).

Note that in the above description, the processing result 1102 is divided into the four partial data A to D and stored at the addresses 1103a to 1103d. However, the present invention is not limited to this, as a matter of course, and the number of divisions of a processing result and the addresses can arbitrarily be changed. Also, for example, in image analysis processing for dividing one image data into a plurality of regions and outputting a processing result for each of the plurality of regions, the processing results of the divided regions may be stored in a plurality of areas of different addresses in the memory unit 404. That is, a plurality of processing results corresponding to a plurality of divided regions may be stored distributedly in a plurality of areas of the memory unit 404.

As described above, according to the first embodiment, in an apparatus (for example, an apparatus that does not know the specific address A of the memory unit 404) that does not confirm the number of data of a processing result or a processing result storage address, a processing result is read out as a simple enumeration of data. It is therefore possible to prevent the data of a processing result from easily being analyzed.

Second Embodiment

In the first embodiment, if an area where partial data is stored is read-accessed by a read command that is not a processing result read request, the partial data is directly output. In the second embodiment, if an area where partial data is stored is read-accessed by a read command that is not a processing result read request, the partial data is masked and then output. Processing of masking a processing result and outputting it will be described below with reference to FIG. 13. Note that the overall arrangement and divisional storage of the data of a processing result are the same as described in the first embodiment. In addition, the same step numbers as in the first embodiment (FIG. 12) denote similar processes in FIG. 13.

An FPGA 402 confirms a parameter (command argument portion 705) in a read command and determines whether the read command is a processing result read request (step S1202). Processing performed when it is determined that the read command is a processing result read request is similar to that in the first embodiment (steps S1205 to S1207). If it is determined that the read command is not a processing result read request, the FPGA 402 determines whether a read range designated by the address and the number of data in the read command includes an area where a divided processing result (partial data) is stored (step S1301). If the designated read range does not include the area where a divided processing result (partial data) is stored, the FPGA 402 executes the processes of steps S1203 and S1204 described with reference to FIG. 12. If the designated read range includes the area where a divided processing result is stored, the FPGA 402 transmits a meaningless random value to an arithmetic processing unit 203 as the read data of a block of the area (step S1302).

Note that even if a multi-read command that does not use a block designation command is issued, the FPGA 402 controls to output a random value during the read of the processing result (partial data). For example, the FPGA 402 stores the address designated by the multi-read command and monitors the number of read blocks until a transfer stop command is issued (during the read of the data). The FPGA 402 detects the timing of reading out an address at which the processing result is stored based on the designated address and the number of read blocks, and outputs a random value to the arithmetic processing unit 203 during that period.

Here, for a read command that is not a processing result read request, a meaningless random value is output. However, the present invention is not limited to this, and a fixed value formed by only "0s" or only "1s" may be returned with as many as the requested data.

According to the second embodiment, it is possible to make it difficult to read out a processing result of image analysis processing from an apparatus that cannot confirm the processing result read request procedure.

Third Embodiment

In the third embodiment, a processing result of image analysis processing is divided into data that is smaller than the amount of data (the data amount of one block) that can be held by one cell of a memory unit 404 and stored, thereby strengthening protection of a processing result. The overall arrangement and processing are similar to those in the first embodiment (FIGS. 10 and 12). Portions different from the first embodiment will mainly be described below.

In the SD standard, one block that is a unit of data write or read has a size of 512 bytes. In step S1007, an FPGA 402 divides a processing result obtained in step S1006 into data whose data amount is smaller than 512 bytes and fills the remaining empty portion of the block with a meaningless numerical value such as "0s". For example, if there is a processing result of 50 blocks, the data is divided into data each having a size of 256 bytes, "0s" corresponding to 256 bytes are added to each divided data, and the data is stored as data of 100 blocks in the memory unit 404. At this time, data configuration information representing which range of the data of one block corresponds to the processing result is stored in a processing result division table. Also, at this time, all the data of 100 blocks may be distributedly stored as individual partial data in different areas of the memory unit 404. Alternatively, data of an arbitrary number of blocks may be stored as one partial data in a different area. In step S1008, internal write commands are issued a plurality of times to store the thus obtained partial data in the memory unit 404.

A method of reading out and combining processing results will be described next. If a processing result read request is issued from the arithmetic processing unit 203 (YES in step S1202), the FPGA 402 reads out the data of 100 blocks stored in different areas based on the stored processing result division table (step S1205). Next, the portion filled with "0s" is deleted based on the data configuration information, the data are combined to restore the processing result of 50 blocks, and the data is transmitted to the arithmetic processing unit 203 (step S1206). If a read command other than a processing result read request is issued for the divided data, the data including the portion filled with "0s" is transmitted in an unchanged state to the arithmetic processing unit 203. The data of a meaningless portion other than a processing result is filled with "0s" here for the descriptive convenience. However, the present invention is not limited to this, and the portion may be filled with another predetermined value or a random value.

As described above, according to the third embodiment, a processing result is divided into a plurality of data with a size smaller than a block, and a predetermined value or a random value is added to each of the plurality of divided data, thereby generating data with the size of one block. Partial data of the processing result is generated using the thus generated data with the size of one block. As a result, according to the third embodiment, if the data of the area of the processing result is read out from an apparatus that does not confirm the processing result read request, data including meaningless data is read out. It is therefore more difficult to reconstruct the processing result.

As described above, according to the embodiments, an image capture apparatus that cannot correctly generate a command for reading out a processing result (for example, an image capture apparatus that does not know the address to store the result of analysis processing and the data size) cannot read out a correct analysis result.

Note that in the first to third embodiments, an image capture apparatus has been exemplified as an electronic apparatus to which the detachable device 100 is attached. However, the present invention is not limited to this. Also, in the above-described embodiments, since an image capture apparatus has been exemplified, image data is input as data of arithmetic processing target. However, the present invention is not limited to this. That is, if data as a target of analysis processing is input, the detachable device 100 divides a processing result obtained by analyzing the data into a plurality of partial data and stores these, and the contents of data are not particularly limited.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-058305, filed Mar. 27, 2020 which is hereby incorporated by reference herein in its entirety.

What is claimed is:

1. A detachable device that can be attached/detached to/from an electronic apparatus and includes a memory unit, comprising:
    an analysis unit configured to analyze input data for analysis from the electronic apparatus;
    a storage unit configured to divide a processing result obtained by the analysis unit into a plurality of partial data and store the partial data in a plurality of areas of the memory unit such that addresses are not continuous;
    a determination unit configured to determine, based on a parameter included in a read command from the electronic apparatus, whether the read command is a command for reading out the processing result; and
    an output unit configured to, if it is determined that the read command is the command for reading out the processing result, read out the plurality of partial data from the plurality of areas of the memory unit, construct the partial data to the processing result, and output the processing result.

2. The device according to claim 1, wherein the storage unit stores input data for storage from the electronic apparatus in the memory unit in an area of the memory unit such that address are continuous.

3. The device according to claim 1, wherein the determination unit determines, based on a parameter that is included in the read command and designates an address of read and a size of data, whether the read command is the command for reading out the processing result.

4. The device according to claim 1, wherein if the determination unit determines that the read command is not the request for reading out the processing result, data of a size designated by the read command is read out from an address designated by the read command in the memory unit and output.

5. The device according to claim 1, wherein if an address designated by the read command is an address at which the processing result is stored, and a size of data designated by the read command corresponds to a size of data of the processing result, the determination unit determines that the read command is the request for reading out the processing result.

6. The device according to claim 1, wherein an address to store the processing result obtained by the analysis unit and a size of data of the processing result are stored at a predetermined address of the memory unit.

7. The device according to claim 1, wherein the storage unit issues write commands a plurality of times to store the plurality of partial data in the plurality of areas of the memory unit in accordance with a command for analyzing the data from the electronic apparatus.

8. The device according to claim 1, wherein the storage unit issues a write command for storing the data in the memory unit only once in accordance with a command for storing the data from the electronic apparatus.

9. The device according to claim 1, wherein if it is determined that the read command from the electronic apparatus is the command for reading out the processing result, the output unit issues a plurality of read commands for reading out the plurality of partial data from the plurality of areas of the memory unit.

10. The device according to claim 1, wherein the analysis unit divides the input data for analysis into a plurality of divided regions and performs analysis processing, and
the storage unit stores a plurality of processing results corresponding to the plurality of divided regions as the plurality of partial data.

11. The device according to claim 1, wherein if the read command from the electronic apparatus, which is determined not to be the command for reading out the processing result, designates read of data from an area where the partial data is stored, the output unit outputs a value irrelevant to the partial data.

12. The device according to claim 11, wherein the irrelevant value is one of a random value and a fixed value.

13. The device according to claim 1, wherein the storage unit divides the processing result into a plurality of data with a size smaller than a block that is a unit of data read and write in the memory unit, adds one of a predetermined value and a random value to each of the plurality of divided data to generate data of a size of one block, and generates the partial data using the data.

14. The device according to claim 1, wherein if it is determined that the read command is the command for reading out the processing result, the output unit extracts the partial data from the block read out from the memory unit and combines the partial data, thereby constructing the processing result.

15. A control method of a detachable device that can be attached/detached to/from an electronic apparatus and includes a memory unit, comprising:
analyzing input data for analysis from the electronic apparatus;
dividing a processing result obtained by the analysis into a plurality of partial data and storing the partial data in a plurality of areas of the memory unit such that addresses are not continuous;
determining, based on a parameter included in a read command from the electronic apparatus, whether the read command is a command for reading out the processing result; and
if it is determined that the read command is the command for reading out the processing result, reading out the plurality of partial data from the plurality of areas of the memory unit, constructing the partial data to the processing result, and outputting the processing result.

16. A non-transitory computer-readable storage medium that stores a program configured to cause a computer to execute a control method of a detachable device that can be attached/detached to/from an electronic apparatus and includes a memory unit, the control method comprising:
analyzing input data for analysis from the electronic apparatus;
dividing a processing result obtained by the analysis into a plurality of partial data and storing the partial data in a plurality of areas of the memory unit such that addresses are not continuous;
determining, based on a parameter included in a read command from the electronic apparatus, whether the read command is a command for reading out the processing result; and
if it is determined that the read command is the command for reading out the processing result, reading out the plurality of partial data from the plurality of areas of the memory unit, constructing the partial data to the processing result, and outputting the processing result.

* * * * *